(12) United States Patent
    Kitamura

(10) Patent No.: US 9,033,532 B2
(45) Date of Patent: May 19, 2015

(54) MACHINING CENTER

(71) Applicant: KITAMURA MACHINERY CO., LTD., Takaoka-shi, Toyama (JP)

(72) Inventor: Akihiro Kitamura, Takaoka (JP)

(73) Assignee: KITAMURA MACHINERY CO., LTD., Toyama (JP)

( * ) Notice: Subject to any disclaimer, the term of this patent is extended or adjusted under 35 U.S.C. 154(b) by 319 days.

(21) Appl. No.: 13/741,643

(22) Filed: Jan. 15, 2013

(65) Prior Publication Data

US 2013/0201656 A1    Aug. 8, 2013

(30) Foreign Application Priority Data

Feb. 3, 2012  (JP) ................ 2012-000536
Jul. 4, 2012   (JP) ................ 2012-004048

(51) Int. Cl.
    *B23Q 17/24*     (2006.01)
    *B23Q 11/08*     (2006.01)

(52) U.S. Cl.
    CPC ............ *B23Q 17/24* (2013.01); *B23Q 11/0891* (2013.01)

(58) Field of Classification Search
    CPC ... B60H 1/00964; B60H 1/32; B32Q 17/2404
    USPC ................................... 362/89, 376
    See application file for complete search history.

(56) References Cited

U.S. PATENT DOCUMENTS 8,388,158 B2 *   3/2013   Devos et al. ............ 362/92

* cited by examiner

*Primary Examiner* — Ali Alavi
(74) *Attorney, Agent, or Firm* — Bacon & Thomas, PLLC

(57) ABSTRACT

A machining center is provided with a guard that covers a processing portion of a machine tool. An openable and closable operation door is provided at the guard front. The operation door is arched along a vertical direction from the guard surface. The operation door is provided with a handle used to open and close the operation door. The operation door is curved on an arched line that reaches a highest point at its center and lowers toward the top and bottom ends. The guard is provided with half-round LED display means protruding from the guard surface. The operation door is made of carbon fiber.

14 Claims, 10 Drawing Sheets

MACHINING CENTER

BACKGROUND OF THE INVENTION

1. Field of the Invention

The present invention relates to a machining center that is provided with a guard for covering a processing portion of a machine tool and is provided with an openable and closable operation door in front of the guard.

2. Description of Related Art

This type of operation door is conventionally known.

As a known technology, a flat fixed portion at a processing portion front of a machine tool body is vertically provided with elongate and flat LED display means away from an operation door provided for a guard. In this case, an operator can visually check the presence or absence of displayed information on even the flat LED display means away from the tool at a position where the operator can easily view the processing portion front of the tool body. However, it has been difficult to visually check the presence or absence of displayed information on the LED display means at a position where the processing portion front of the tool body is hardly visible, for example, at a side distant from the tool body. The operator may fail to confirm displayed information on the LED display means or may misunderstand the displayed information.

As a related art, the operation door for the processing portion of the tool body is mainly made of steel or ordinary resin (FRP). A steel door has disadvantages: (a) heavy; (b) painting needed; and (c) easily scarred. A door made of ordinary resin (FRP) has disadvantages: (d) low in intensity and easily destructible and (e) easily scarred soft surface.

SUMMARY OF THE INVENTION

The present invention aims at providing a machining center widely facilitating visual check on operation state of a machine tool from afar.

The appended claims exemplify solutions discussed in the invention.

According to the invention, a guard is provided to cover a processing portion of a machine tool body. An operation door is provided on the guard front and is arched along a vertical direction from a surface of the guard.

LED display means is provided for the guard (favorably an upper part of its front) of the machine tool body. Alternatively, the LED display means is provided for one of or both of two sides of an arched door portion. The LED display means, if provided as described above, enables to confirm a tool operation state when the operation door is opened and closed. The LED display means facilitates wide visual check on a tool operation state from afar.

The operation door is raised or curved (favorably arched) from the guard surface at the front of the tool body along a vertical direction. The operation door is one of most protruding parts at the tool front. The LED display means may be provided for the guard surface at the front of the tool body or an arched portion of the openable and closable door to enable easy and accurate visual check over a wide range from afar. The LED display means easily and accurately enables visual check on the presence or absence of displayed information and the contents thereof from various positions distant from the tool.

The operation door is made of carbon fiber. It should be noted that the carbon fiber described in this application is broadly interpreted to include carbon fiber reinforced plastics (C-FRP). The operation door made of carbon fiber has the following advantages. (1) The carbon fiber does not deteriorate and guarantees long-term quality. (2) The carbon fiber is stronger and less destructible than steel. (3) The carbon fiber is a hard material almost free from scar on the surface. (4) The carbon fiber features low specific gravity, allowing a little strength to open and close the door. (5) The carbon fiber is capable of molding to be used as is without painting on the surface. As an additional advantage, (6) the carbon texture excels in the quality of material and provides good touch and a high-quality look.

The present invention relates to a machining center provided with a guard that covers a processing portion of a machine tool body for ensuring safety. An operation door is provided at the guard front. The front of the operation door is arched along a vertical direction. The operation door is provided with a rod-shaped handle used to open and close the operation door. The handle is arched to extend in a vertical direction.

The bottom of the guard is provided with a skirt having a horizontally corrugated surface. An upper part of the guard front is provided with LED display means such as a signal light adjacently to or far from the operation door. The LED display means protrudes from the guard surface and has a half-round or polygonal cross-section.

The LED display means may be provided for only one of two sides of the operation door. The LED display means can be provided for both sides of the operation door.

The operation door side may be raised perpendicularly to a flat surface of a tool-body guard (e.g., splash guard). The operation door side may be sloped at a proper angle (e.g., around 45 degrees). In this case, an operator can easily view the displayed information on the LED display means even from a direction oblique to the tool body if the LED display means is provided near the operation door.

The LED display means is favorably provided near or horizontally far from the upper end of each side of the operation door.

The LED display means provided on the guard surface is favorably shaped to be half-round or similarly.

The half-round LED display means is favorably provided near or horizontally far from the upper end of each side of the operation door to protrude from the guard surface and extend in the vertical direction.

Wide visual check can be ensured on the tool front by sloping only an upper area of the operation door having a lowered side or providing half-round LED display means away from the operation door side as needed.

The LED display means may use more than one color to distinguish displayed information by color.

Particularly, the LED display means is favorably provided to protrude from the guard surface and have a half-round or polygonal cross-section, for example. The LED display means is more favorably provided to be protrusive and provide color indications.

For example, the door side may be sloped against the flat guard. The LED display means may be provided near the upper end of the guard while the LED display means has a half-round or polygonal cross-section protruding from the guard surface. Accurate and reliable visual check is available over a wide range from afar.

While the tool is used for machining, it is favorable to close the door and identify an alarm by color. For example, the following color alarms are available.

1) A red alarm indicates that abnormal error has occurred.
2) A yellow alarm indicates that the machining has been completed.
3) A green alarm indicates that the machining proceeds normally.

The door is favorably made of carbon fiber using reinforced plastic. The carbon fiber door hardens the surface, ensures a high-quality look, and is hardly prone to dirt.

BRIEF DESCRIPTION OF THE DRAWINGS

Embodiments of the present invention will be described on the basis of the following figures, in which rear portions of a machining center are not shown in particular in the side views, wherein.

DETAILED DESCRIPTION OF THE INVENTION

Figure 1:
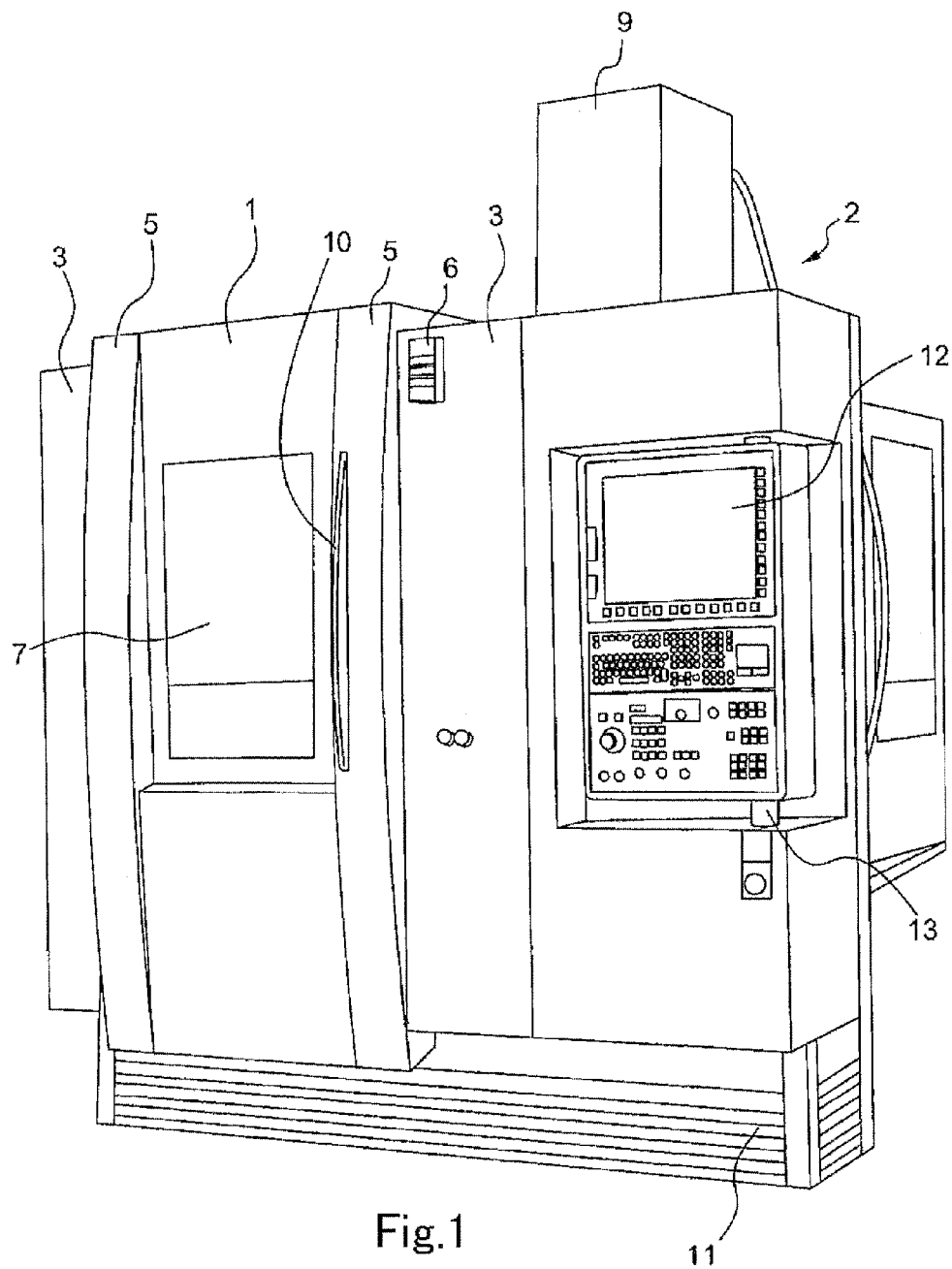
FIG. 1 is a perspective view illustrating a front portion of a machining center according to an embodiment of the invention.

FIGS. 1 through 6 illustrate the machining center according to an embodiment of the invention.

As shown in FIGS. 1 through 6, an openable and closable operation door 1 is provided for the front of a processing portion of the machine tool. The operation door 1 is arched along a vertical direction from the surface of a guard 3 of a tool body 2. The operation door 1 extends between the top and bottom ends of the guard 3 of the tool body 2. The operation door 1 is curved on an arched line that reaches a highest point at its center and lowers toward the top and bottom ends.

LED display means 6 may be provided for only one of two sides 5 of the operation door 1. Alternatively, the LED display means 6 may be provided for both sides 5 of the operation door 1.

The LED display means 6 may be provided adjacently to or away from the side 5 of the operation door 1.

The LED display means 6 is favorably formed to be half-round to protrude from the surface of the guard 3. The LED display means 6 is favorably configured to be several times as long as the half-round width (e.g., diameter).

The LED display means 6 favorably uses more than one color to distinguish displayed information by color.

The door is made of carbon fiber.

The operation door 1 is provided with a handle 10 used to open and close the door 1. The handle 10 is favorably arched to have a shape similar to the operation door 1 along the vertical direction. Namely, the handle 10 is curved on an arched line that reaches a highest point at its center and lowers toward the top and bottom ends. The handle 10 is provided on the side of the operation door 1 to extend along the vertical direction.

The bottom of the guard 3 is provided with a skirt 11 having a horizontally corrugated surface.

A rectangular window 7 is formed on the front of the operation door 1. The window 7 is provided with 3-layer glass to ensure safety during machining.

Figure 2:
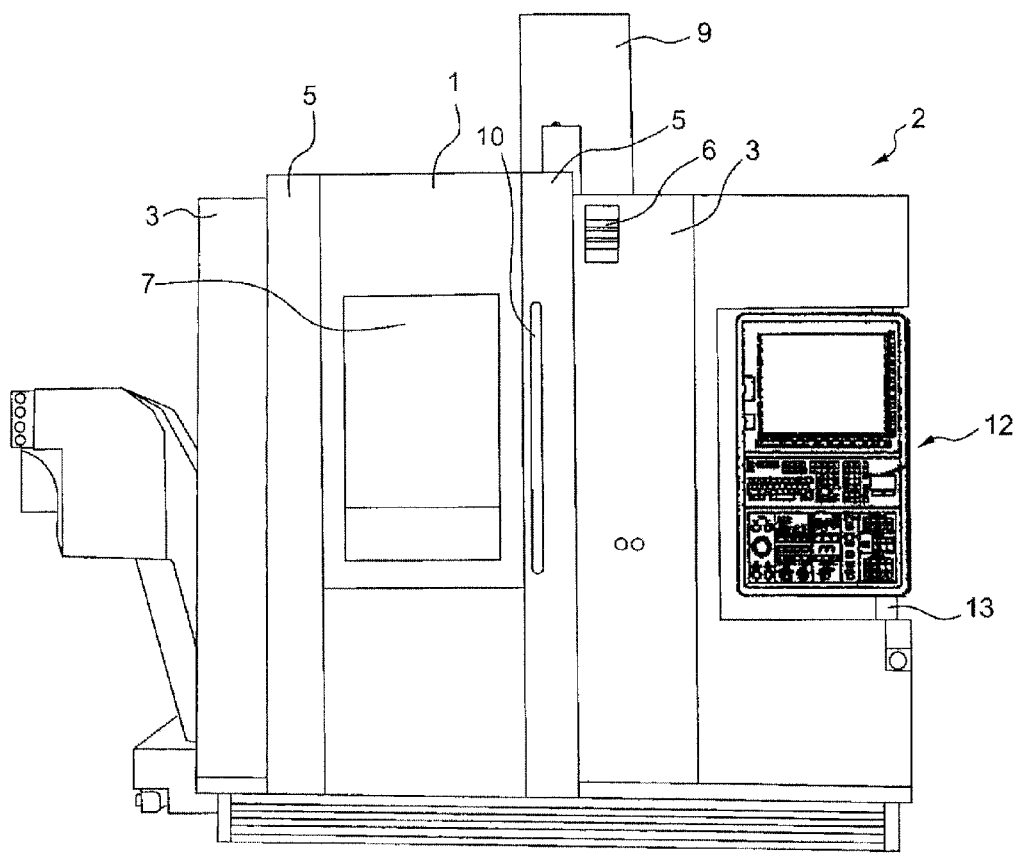
FIG. 2 is a front view illustrating the machining center in FIG. 1 and FIG. 1A.
Figure 3:
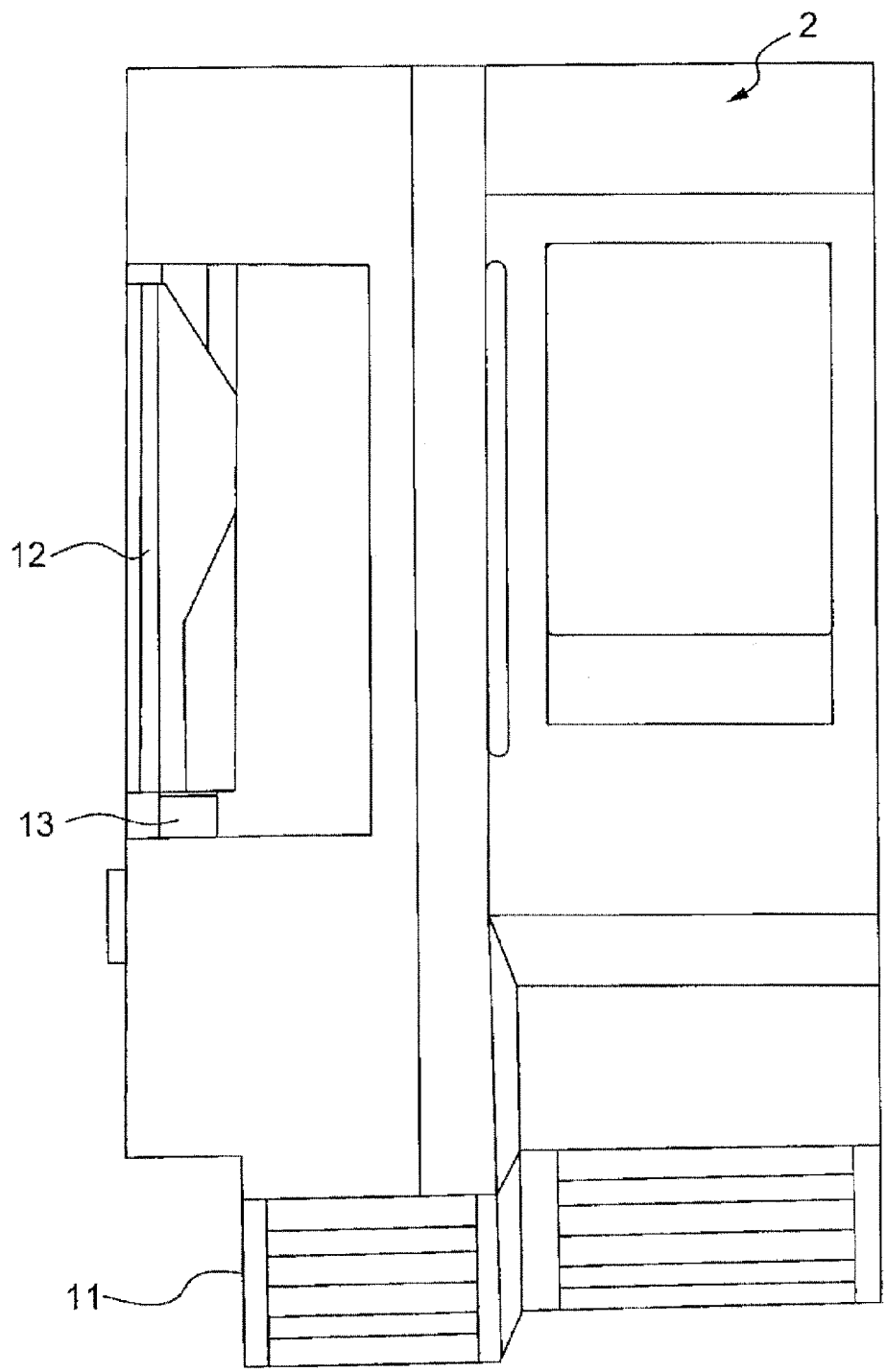
FIG. 3 illustrates a partial right side of the machining center in FIG. 1.
Figure 4:
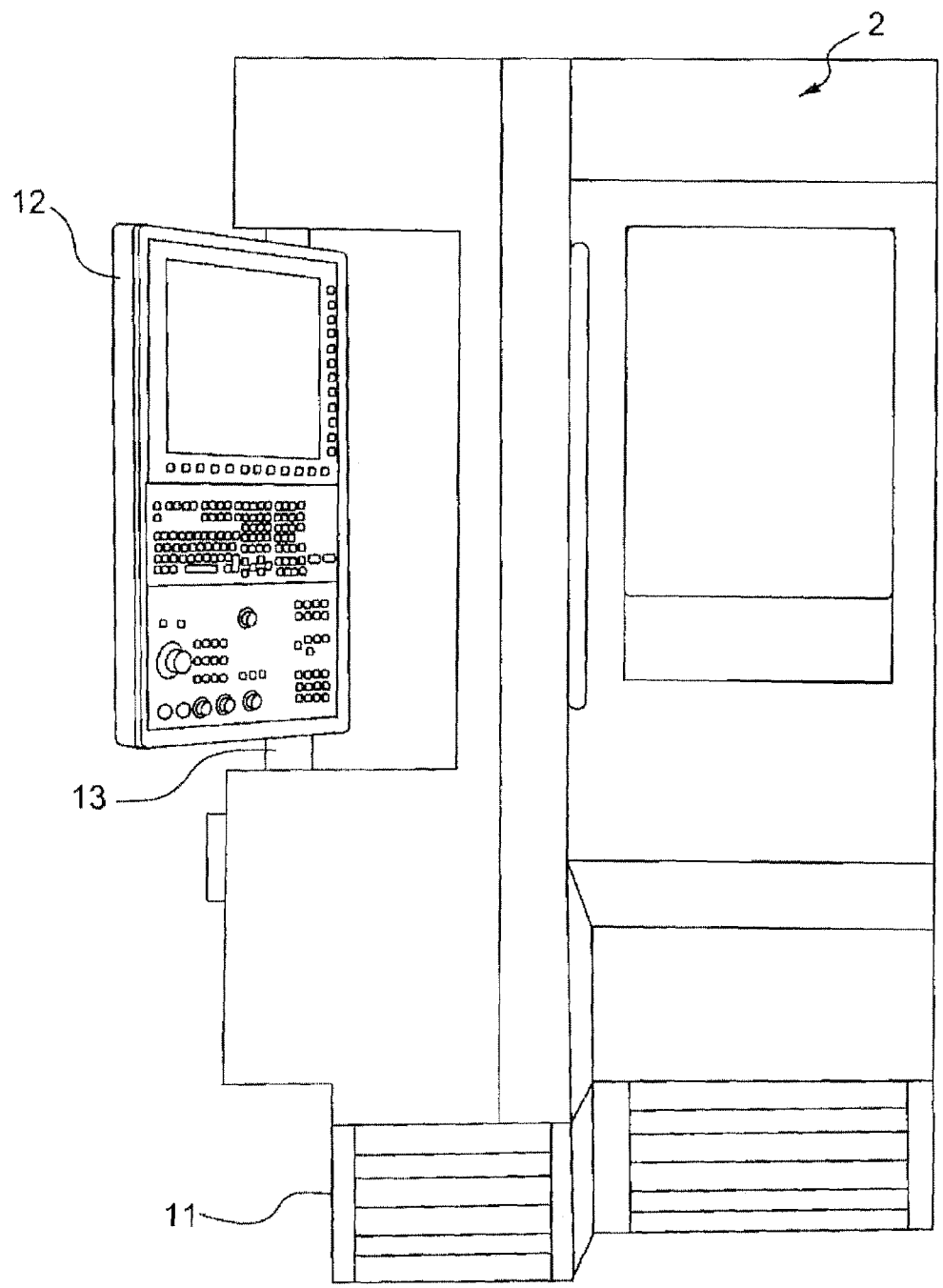
FIG. 4 illustrates the machining center in FIG. 3 with an operation panel rotated to the side of the machining center.
Figure 5:
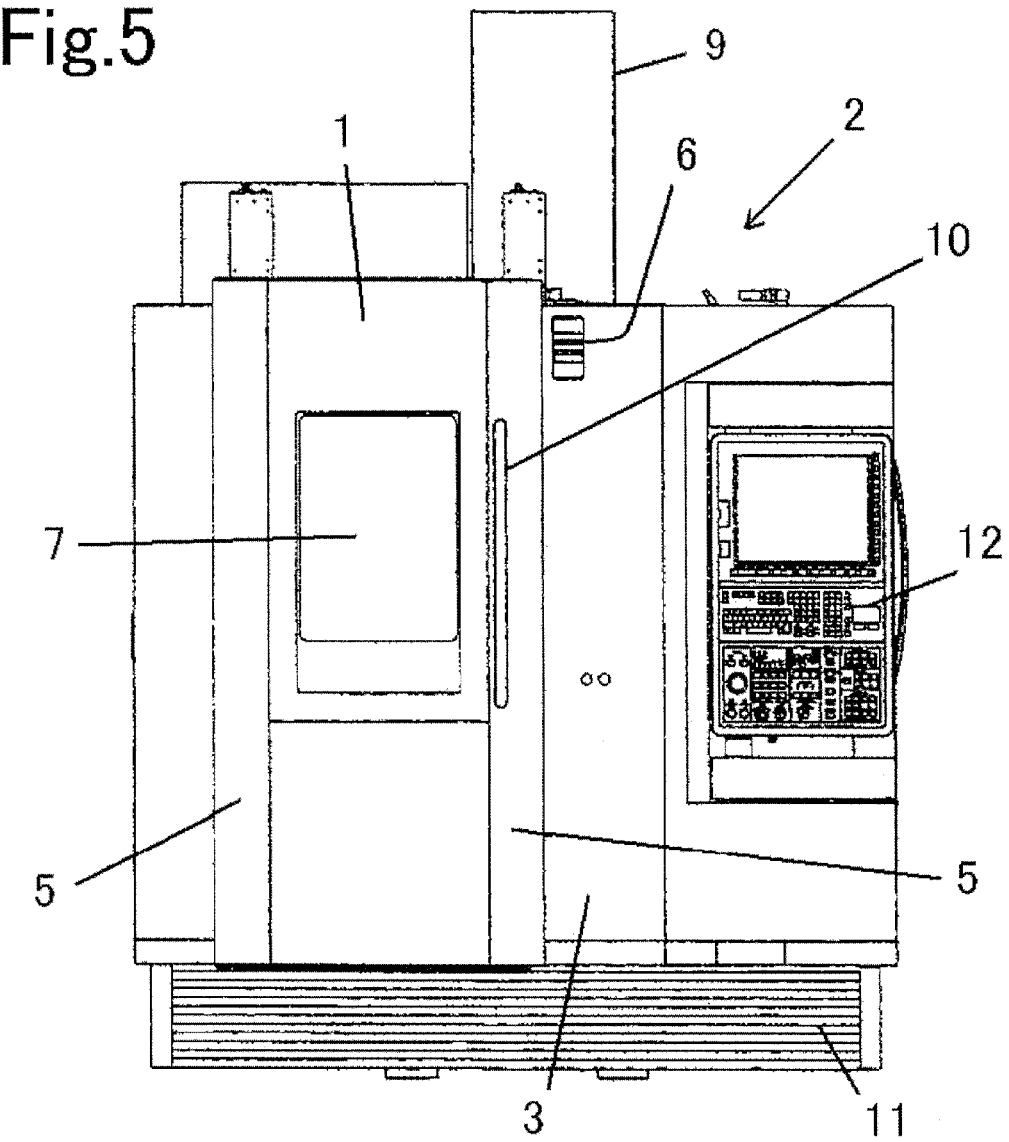
FIG. 5 is a schematic front view illustrating the machining center in FIG. 1.
Figure 6:
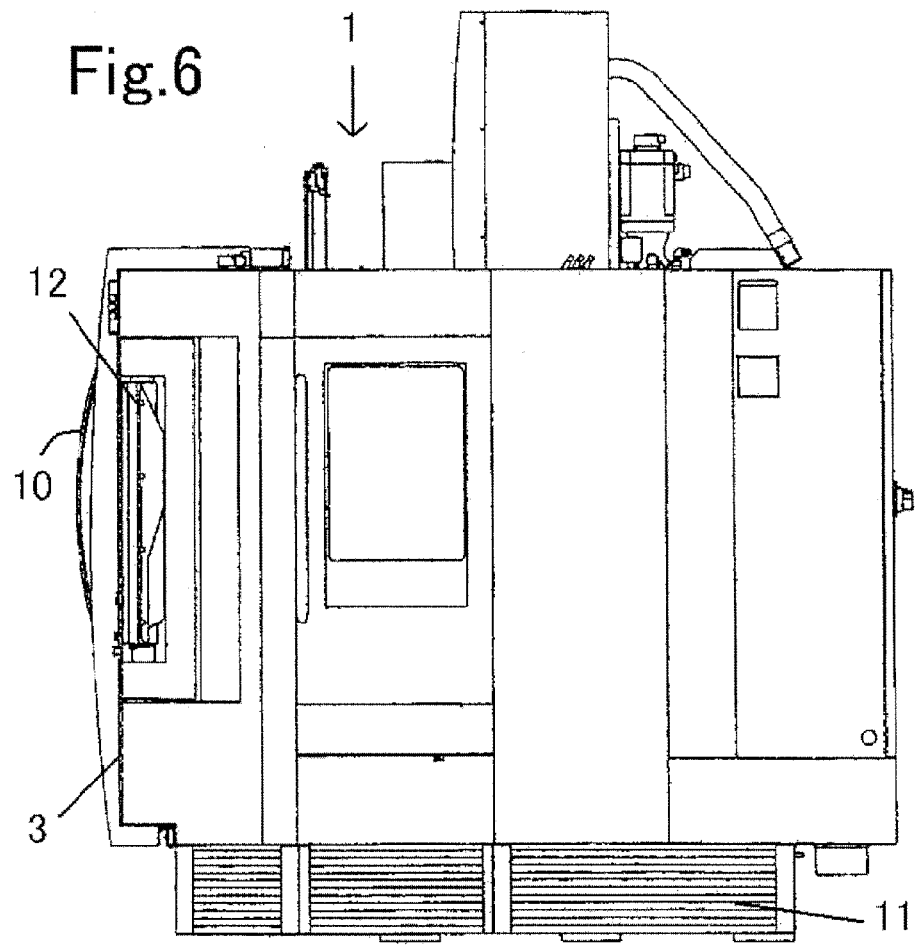
FIG. 6 illustrates a schematic right side view of the machining center in FIG. 1.

FIGS. 1 through 3 illustrate the operation panel 12 before it is rotated. FIG. 4 and FIG. 4A illustrate the operation panel 12 after it is rotated. As will be understood from FIGS. 1 through 4 by comparison, the operation panel 12 can be rotated manually or automatically as needed from the front of the machine tool as illustrated in FIGS. 1 through 3 to the right side of the machine tool. The operation panel 12 rotates around a rotary shaft 13.

Figure 7:
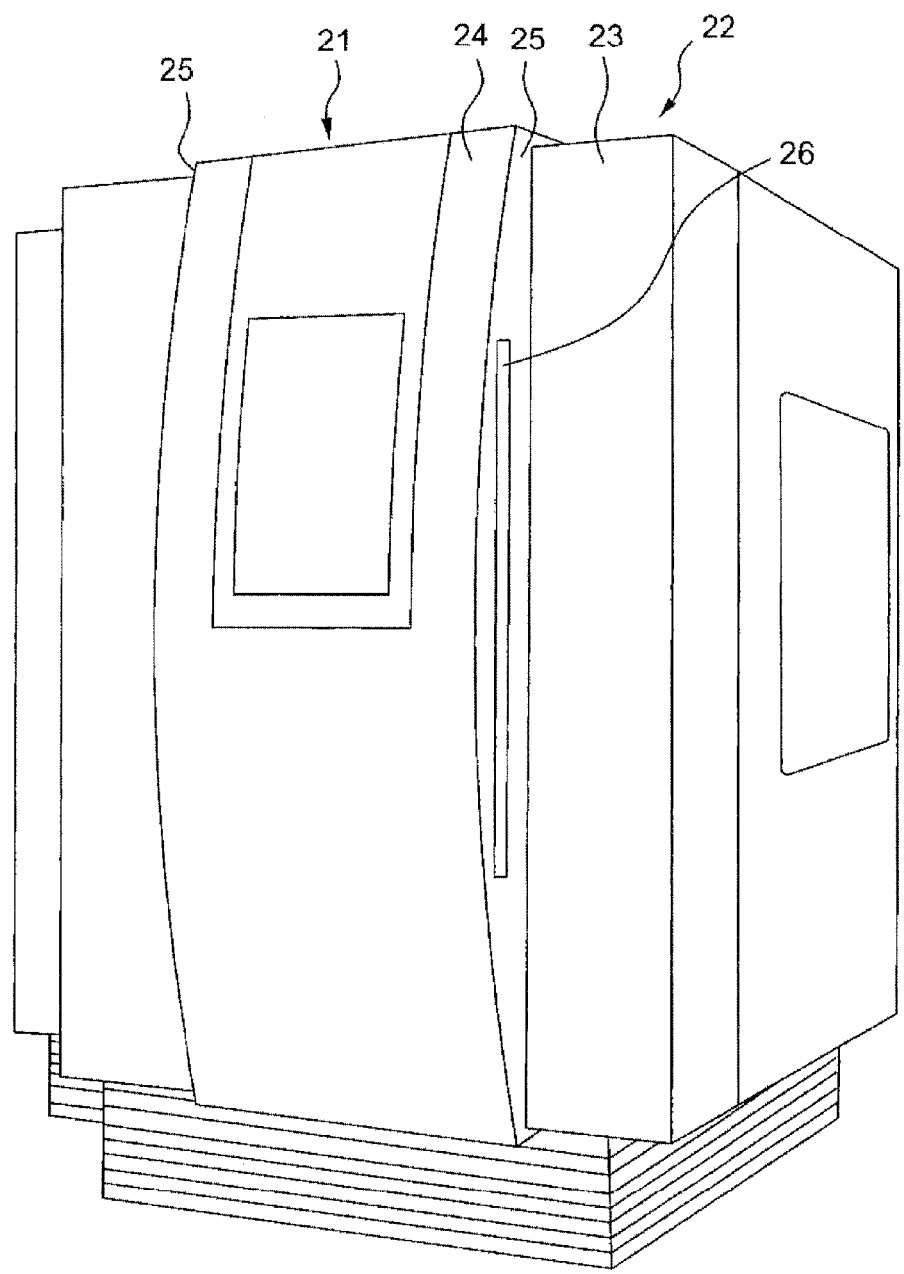
FIG. 7 illustrates another embodiment of the invention.

FIG. 7 illustrates another embodiment of the invention.

As shown in FIG. 7, an openable and closable tool operation door 21 is provided at the tool front. A raised or arched door portion 24 is raised or arched from a cover surface 23 of a tool body 22 to extend along the vertical direction of the tool body 22. LED display means 26 is provided for each of two sides 25 of the raised or arched door portion 24.

The LED display means 26 may be provided for only one of the two sides 25 of the raised or arched door portion 24. The LED display means 26 may be more favorably provided for both the two sides 25 of the arched door portion 24.

The LED display means 26 is provided for an intermediate area between front and rear edges of each side 25 of the arched door portion 24.

The LED display means 26 is formed similarly to a line or a belt.

The LED display means 26 uses more than one color to distinguish displayed information by color.

The door is made of carbon fiber.

Figure 8:
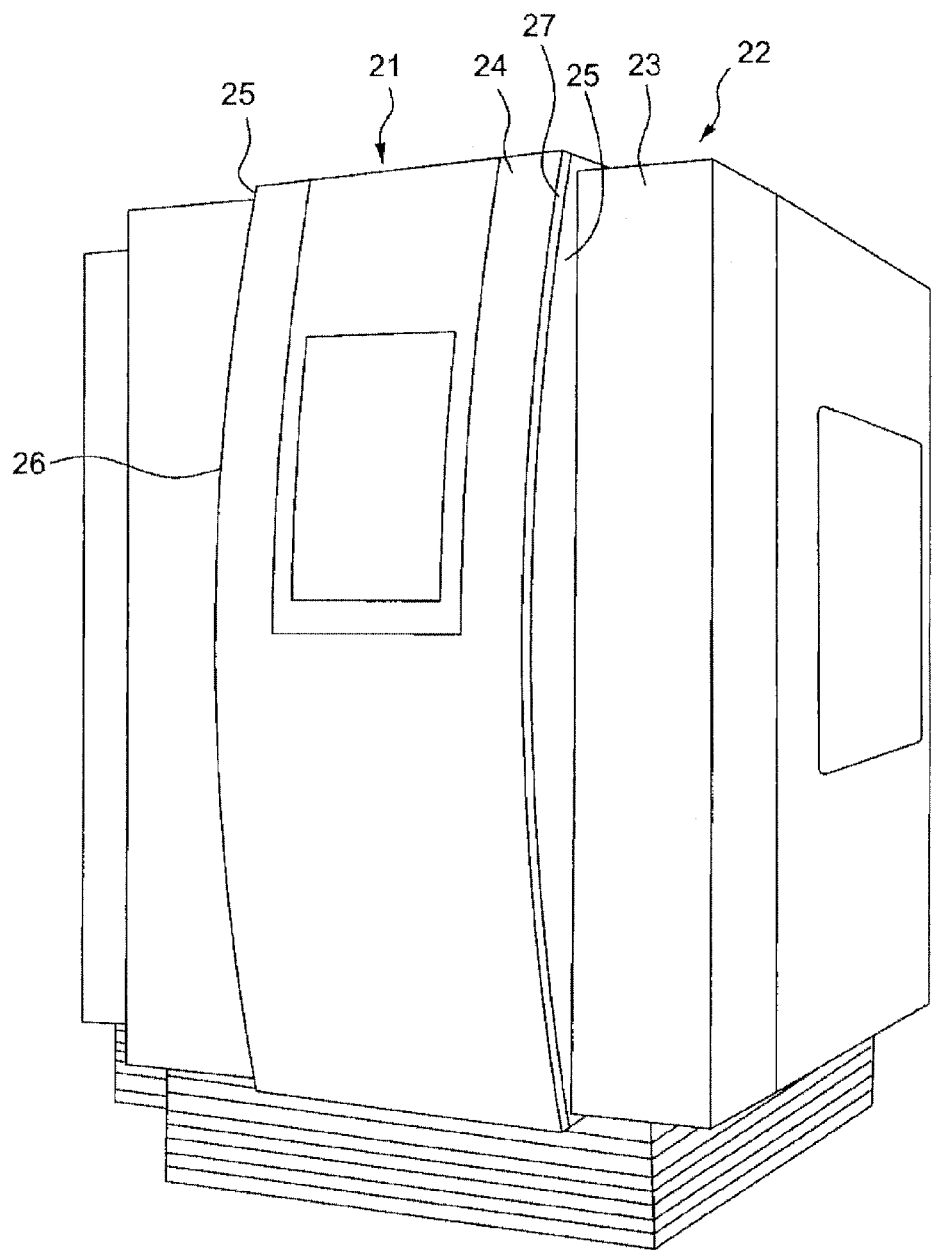
FIG. 8 illustrates yet another embodiment of the invention.

FIG. 8 illustrates yet another embodiment of the invention.

As shown in FIG. 8, the openable and closable tool operation door 21 is provided at the tool front. The raised or arched door portion 24 is raised or arched from the cover surface 23 of the tool body 22 to extend along the vertical direction of the tool body 22.

LED display means 27 is provided for a front edge of both sides 25 of the arched door portion 24. The LED display means 27 is formed similarly to a line or a belt.

The LED display means 27 may be provided for only one of the two sides 25 of the arched door portion 24. The embodiment provides the LED display means 27 for both sides of the raised or arched door portion 24.

The LED display means 27 uses more than one color to distinguish displayed information by color.

The door is made of carbon fiber.

Figure 9:
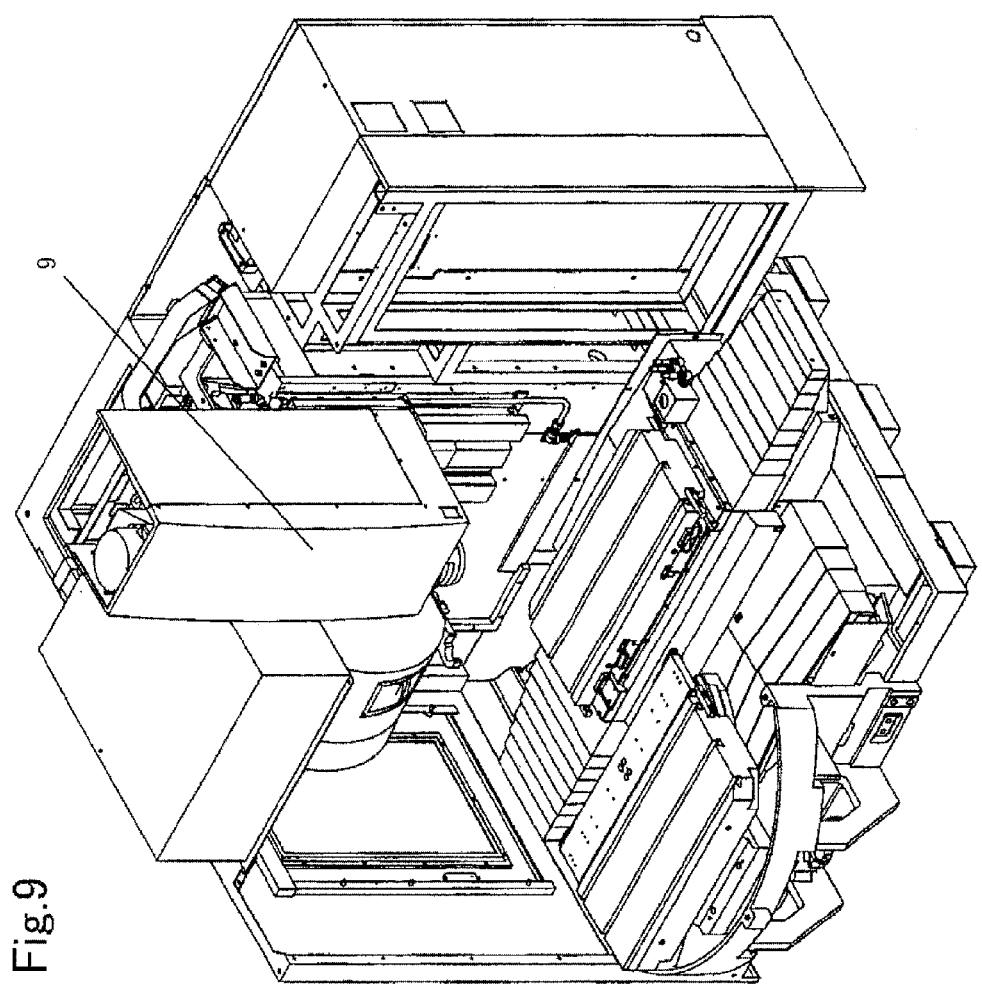
FIG. 9 is a perspective view showing in particular a head cover of the machining center shown FIG. 1.
Figure 10:
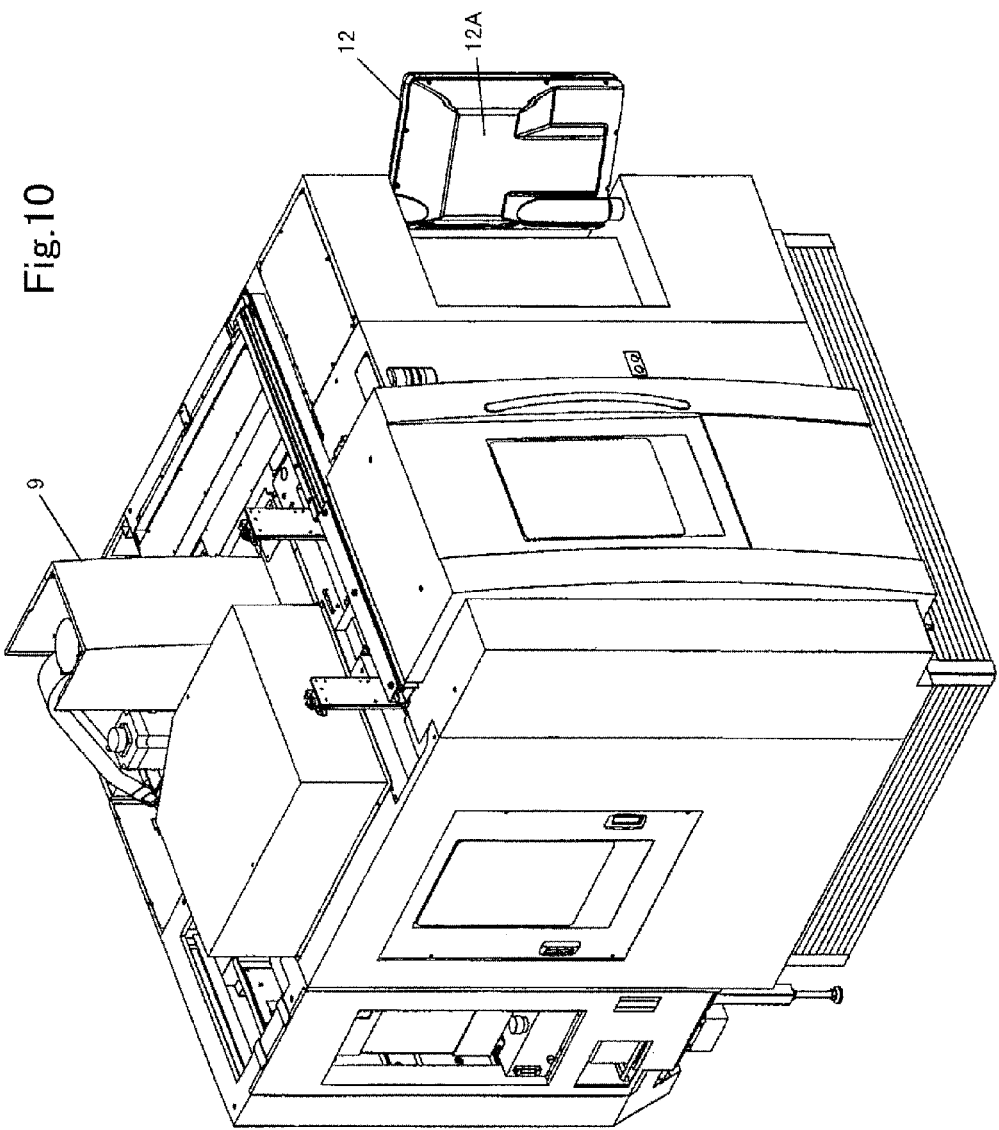
FIG. 10 is a perspective view showing in particular an operation panel of the machining center shown FIG. 1.

FIG. 9 is a perspective view showing in particular a head cover of the machining center shown FIG. 1;

FIG. 10 is a perspective view showing in particular an operation panel of the machining center shown FIG. 1.

In FIGS. 9 to 10, the whole of the head cover 29 and the back-side cover 22A of the operation panel 22 are preferably made of carbon fiber and in particular C-FRP, because the appearance is excellent with high quality, which is not easily damaged.

The invention claimed is:

1. A machining center comprising:
   a guard that covers a processing portion of a machine tool; and
   an openable and closable operation door provided at a front of the guard,
   wherein: the operation door is arched along a vertical direction from a surface of the guard;
   the guard is provided with LED display means; and
   the operation door is made of carbon fiber.

2. The machining center according to claim 1, wherein:
   the LED display means is formed to be half-round; and the LED display means protrudes from the surface of the guard.

3. The machining center according to claim 1, wherein the LED display means is provided adjacently to a side of the operation door.

4. The machining center according to claim 1, wherein the LED display means is provided in an area distant from the side of the operation door.

5. The machining center according to claim 1, wherein the operation door is curved on an arched line that reaches a highest point at its center and lowers toward top and bottom ends.

6. The machining center according to claim 1, wherein:
the operation door is provided with a handle used to open and close the operation door; and
the operation door is curved on the arched line that reaches the highest point at its center and lowers toward the top and bottom ends.

7. The machining center according to claim 1 wherein the LED display means uses a plurality of colors to distinguish displayed information by color.

8. The machining center according to claim 1, wherein an operation panel is provided rotatably around a vertically extending rotary shaft between a front position and a side position of the machine tool with reference to the guard.

9. The tool operation door according to claim 1, wherein a head cover provided in the machine tool is made of carbon fiber.

10. The tool operation door according to claim 1, wherein a back-side cover of an operation panel provided in the machine tool is made of carbon fiber.

11. An openable and closable tool operation door provided at a tool front,
wherein: an arched door portion is arched from a cover surface of a tool body; and
a side of the arched door portion is provided with LED display means shaped similarly to one of a line and a belt.

12. The tool operation door according to claim 11 wherein the LED display means is provided on the front edge of the arched door portion.

13. The tool operation door according to claim 11, wherein the LED display means is provided for one of and otherwise both of two sides of the arched door portion.

14. The tool operation door according to claim 11, wherein the LED display means is provided for an intermediate area between front and rear edges of the side of the arched door portion.

* * * * *